(12) United States Patent  
Gregory

(10) Patent No.: US 8,162,003 B2
(45) Date of Patent: Apr. 24, 2012

(54) FUEL VALVE APPARATUS AND METHOD

(76) Inventor: Damian Gregory, Downey, CA (US)

( * ) Notice: Subject to any disclaimer, the term of this patent is extended or adjusted under 35 U.S.C. 154(b) by 1266 days.

(21) Appl. No.: 11/044,391

(22) Filed: Jan. 26, 2005

(65) Prior Publication Data

US 2005/0166977 A1 Aug. 4, 2005

Related U.S. Application Data

(60) Provisional application No. 60/540,878, filed on Jan. 30, 2004.

(51) Int. Cl.
F16K 11/085 (2006.01)
(52) U.S. Cl. ............. 137/625.41; 251/297; 251/311
(58) Field of Classification Search .............. 137/590, 137/625.41, 625.47; 251/297, 309, 311
See application file for complete search history.

(56) References Cited

U.S. PATENT DOCUMENTS

| 2,377,473 | A | * | 6/1945 | Wolcott | 137/625.11 |
| 4,312,377 | A | * | 1/1982 | Knecht | 137/625.19 |
| 4,328,833 | A | * | 5/1982 | Aurther | 137/625.47 |
| 4,628,962 | A | * | 12/1986 | Pezzarossi | 137/625.47 |
| 4,890,644 | A | * | 1/1990 | Hoeptner, III et al. | 137/625.41 |
| 6,129,338 | A | * | 10/2000 | Golan | 251/310 |

* cited by examiner

Primary Examiner — John Fox
(74) Attorney, Agent, or Firm — Terry L. Miller

(57) ABSTRACT

A fuel valve includes a housing defining a ported standpipe portion for extending upwardly into a fuel tank at a bottom opening thereof. The standpipe sealingly receives a ported and relatively rotational valving member, which also carries a respective resilient sealing collar aligned with and sealingly cooperating at each of the ports of the valving member. The valving member is selectively rotational and may be positioned relative to the standpipe portion in order to stop fuel flow through the valve, or to selectively allow fuel flow through the valve from one or more separate levels of fuel in the fuel tank. A handle on the exterior of the fuel valve provides for selective rotation and positioning of the valving member, and the fuel valve itself may be selectively and conveniently rotated relative to a fuel nipple attached to the fuel tank.

7 Claims, 3 Drawing Sheets

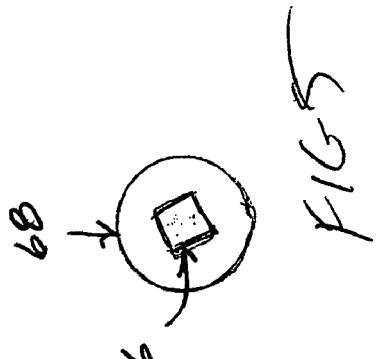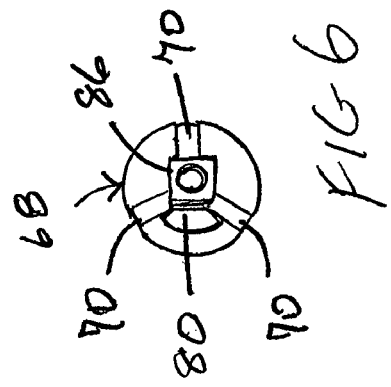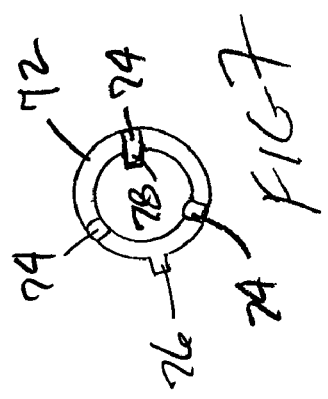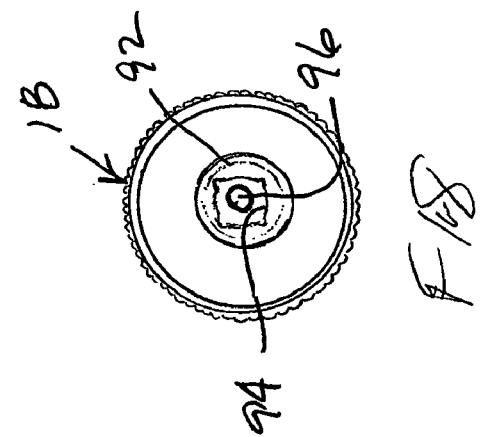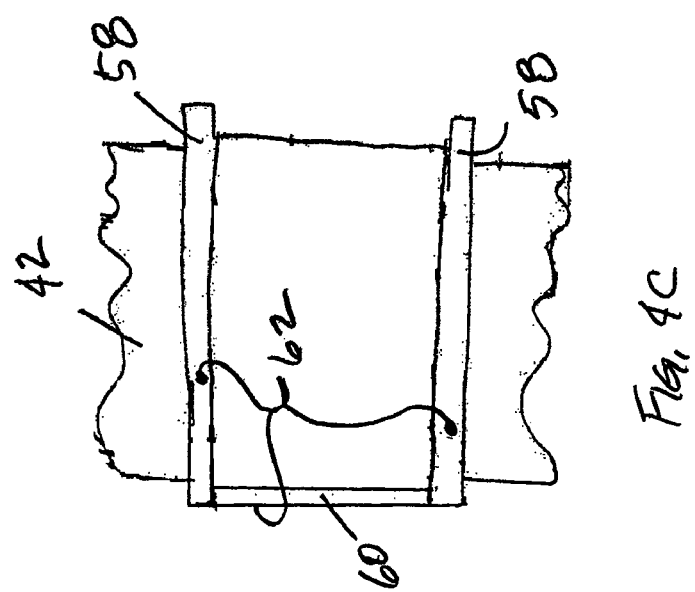

FUEL VALVE APPARATUS AND METHOD

CROSS REFERENCE TO RELATED APPLICATION

This application is related to, and claims benefit of and priority under 35 USC §119(c) from U.S. provisional application No. 60/540,878, filed 30 Jan. 2004.

BACKGROUND OF THE INVENTION

1. Field of the Invention

The present invention relates generally to an improved valve for control of fluid flow, and particularly relates to an improved fuel valve particularly designed and adapted for use on a motorcycle. That is, the present fuel valve provides for mounting of the valve to a motorcycle fuel tank, and allows a user of the motorcycle to choose among three operative positions for the fuel valve. One operative position is a "closed" position, in which fuel flow from the fuel tank is prevented. A second operative position for the fuel valve is an "on" position, in which fuel is allows to flow from the fuel tank so long as the fuel level in the tank is above a certain level. Finally, the improved fuel valve also provides for a "reserve" operative position, in which fuel is allowed to flow from the very bottom of the tank.

2. Related Technology

Motorcycles generally use a fuel valve or fuel petcock to control flow of fuel from a fuel tank to a carburetor or fuel injection system. A number of motorcycle manufactures have and continue to use a manually operated fuel valves that are controlled by the riders of the motorcycles. The fuel valves typically have three settings: open fuel flow, reserve fuel flow, and closed. Typically, when the fuel falls to a certain level in the fuel tank, then the engine of the motorcycle will start to sputter and the rider will switch over to the reserve fuel setting. When the rider stops he or she would move the valve setting to closed.

Although fuel valve systems such as that described above have a distinct advantage over more complicated systems because of their simplicity they also have a number of problems. Typically, they are positioned on the bottom of the fuel tank. The actual position depends on the configuration of the motorcycle. In fact even with the same manufacturer the position of the fuel valve may vary from model to model. Given current designs of these fuel valves, depending on the position of the valve on the fuel tank, its configuration will also vary. This variation in the design and configuration of the fuel valves requires the stocking of many fuel valves of various configurations depending on the position the valve will be placed at the bottom of the tank. Some fuel valves have to be placed on the bottom right side at the front or back of the tank, some are placed on the bottom left side at the bottom left side, etc.

Thus, both motorcycle manufacturers and motorcycle shops have to deal with a number of different fuel valve configurations in order to have the proper valve available. It follows that there is a need for a fuel valve with a single configuration that can be used at any position at the bottom of a fuel tank. Additionally, the fuel valve must have a simple and straight forward configuration that does not significantly affect operating efficiency.

More particularly, a number of conventional fuel valves, or fuel petcocks, are known and used on motorcycles. One type of conventional fuel valve that is used on motorcycles includes a body defining a pair of ports, one opening from the bottom of the fuel tank, and the other communicating from the top of a standpipe extending a short distance upwardly from the bottom of the fuel tank. These ports open on a flat circular surface of the body, and a circular elastomeric sealing member is pressed into sealing association with this flat circular surface, and defines ports aligning with the ports of the body. A valving member is movably carried by the valve body, and is pressed against the elastomeric member. This valving member defines passages communicating one or the other of the ports with an outlet passage, depending upon the rotational orientation of the valving member.

A common deficiency of such conventional fuel valves or fuel petcocks for motorcycles is that they are designed and assembled in such a way that the internal components, including sealing members, such as O-rings, for example, cannot be accessed for replacement. That is, many such valves are composed of housing portions that are swaged or riveted together, and which are damaged or destroyed by any attempt at disassembly. Consequently, when an owner of a motorcycle using such a conventional valve experiences leakage of the valve, the entire conventional valve must be thrown away and replaced by a new valve, causing considerable expense for the owner.

SUMMARY OF THE INVENTION

In view of the deficiencies of the conventional related technology, it is an object of this invention to overcome or reduce one or more of these deficiencies.

Accordingly, one particularly preferred embodiment of the present invention provides a fuel valve for attachment to a lower extent of a fuel tank. This fuel valve comprises a vertically elongate valve body including a external body portion disposed external to the fuel tank and carrying an operating handle for the fuel valve; the external portion also having a fuel outlet port; an elongate stand pipe portion extending from the external body portion and extending generally vertically upwardly within the fuel tank and fuel therein, the stand pipe portion defining a pair of vertically spaced apart ports each allowing flow of fuel into the stand pipe portion; an elongate valving assembly rotationally received into the external body portion and extending upwardly within the stand pipe portion, the elongate valving assembly including a tubular part disposed within the stand pipe portion and defining a flow path communicating to the fuel outlet port, and the tubular part defining a respective pair of vertically spaced apart openings aligning axially with the pair of ports of the stand pipe portion and rotational relative thereto to each be rotated between a first position in which an opening of the tubular part is rotationally aligned with a respective port of the stand pipe portion and allows flow of fuel into the tubular part, and a second position in which the opening of the tubular part is rotated out of rotational alignment with a respective port of the stand pipe portion and prevents flow of fuel into the tubular part; and drive mechanism drivingly connecting the operating handle to the valving assembly so that movement of the operating handle moves the valving assembly rotationally within the stand pipe portion.

Other objects, features, and advantages of the present invention will be apparent to those skilled in the art from a consideration of the following detailed description of a preferred exemplary embodiment thereof taken in conjunction with the associated figures which will first be described briefly.

BRIEF DESCRIPTION OF THE DRAWING FIGURES

FIG. 1 provides an exterior elevation view of a fuel valve embodying the present invention;

FIG. 3 is a cross sectional elevation view of a body portion of the fuel valve seen in FIGS. 1 and 2;

FIG. 4 is a cross sectional elevation view of a valving member portion of the fuel valve seen in FIGS. 1-3, and is illustrated at a slightly larger size than the body seen in FIG. 3;

FIG. 4A is an enlarged fragmentary view of an encircled portion of the valving member seen in FIG. 4, and illustrates a sealing collar member carried on the valving member;

FIG. 4B is a still more greatly enlarged fragmentary view of the encircled portion of the valving member seen in FIG. 4, and provides an exterior elevation view of the sealing collar member;

FIG. 4C is a fragmentary elevation view of the valving member seen in FIGS. 4, 4A, and 4B, and is taken looking in the direction of the arrows 4C in FIG. 4B;

FIGS. 5 and 6 illustrate opposite sides of a detent disk portion of the fuel valve;

FIG. 7 illustrates a detent ring portion of the fuel valve; and

FIG. 8 provides an underside or inside view of an operating knob portion or handle of the fuel valve.

DETAILED DESCRIPTION OF AN EXEMPLARY PREFERRED EMBODIMENT OF THE INVENTION

While the present invention may be embodied in many different forms, disclosed herein is one specific exemplary embodiment which illustrates and explains the principles of the invention. In conjunction with the description of this embodiment, a method of providing and operating a fuel valve according to this invention will be apparent. It should be emphasized that the present invention is not limited to the specific embodiment illustrated.

Figure 1:
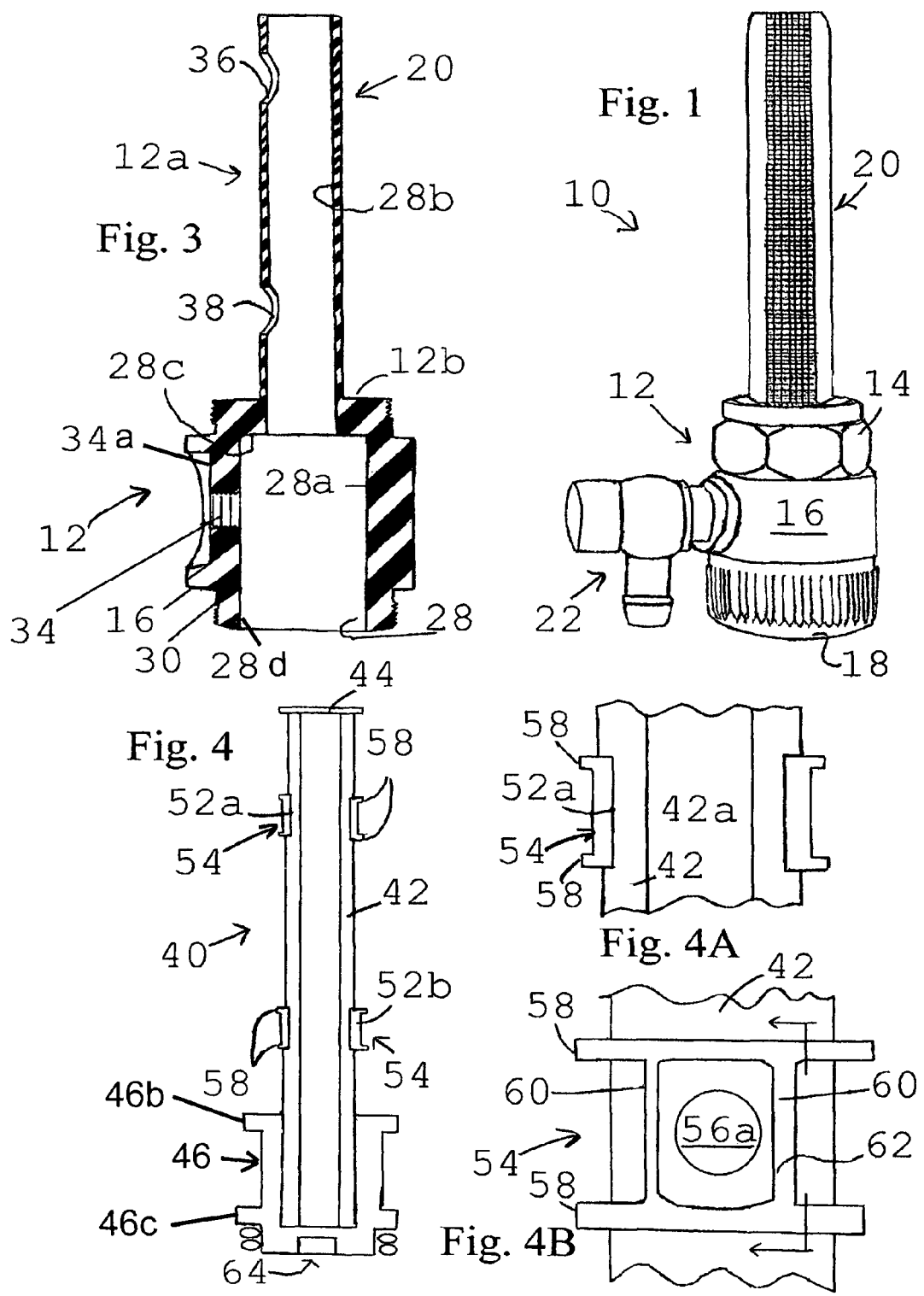

While the fuel valve according to the present invention is particularly designed and configured to be used as the fuel valve or petcock on a motorcycle, the invention is not so limited. Accordingly, the present fuel valve may be used to control the flow of fuel on other types of vehicles, and indeed, may be used to control the flow of fluids other than fuel. Referring first to FIG. 1 for an overview, a fuel valve 10 includes an elongate body 12, carrying a relatively rotational gland nut 14 for sealingly attaching the fuel valve to a depending pipe nipple disposed at the bottom of a fuel tank (not shown in the drawing Figures). Outwardly of the fuel tank, the fuel valve includes a cylindrical body portion 16 upon which is rotationally carried a control knob or handle portion 18. Inwardly of the fuel tank, the body 12 carries an elongate generally vertically extending portion (or stand pipe) 20 extending inwardly and upwardly of the fuel tank within the fuel therein. The outer body portion 16 also carries a hose barb assembly, generally referenced with the numeral 22, from which a fuel line tubing may connect in order to convey fuel to the carburetor of a motorcycle, for example.

Figure 2:
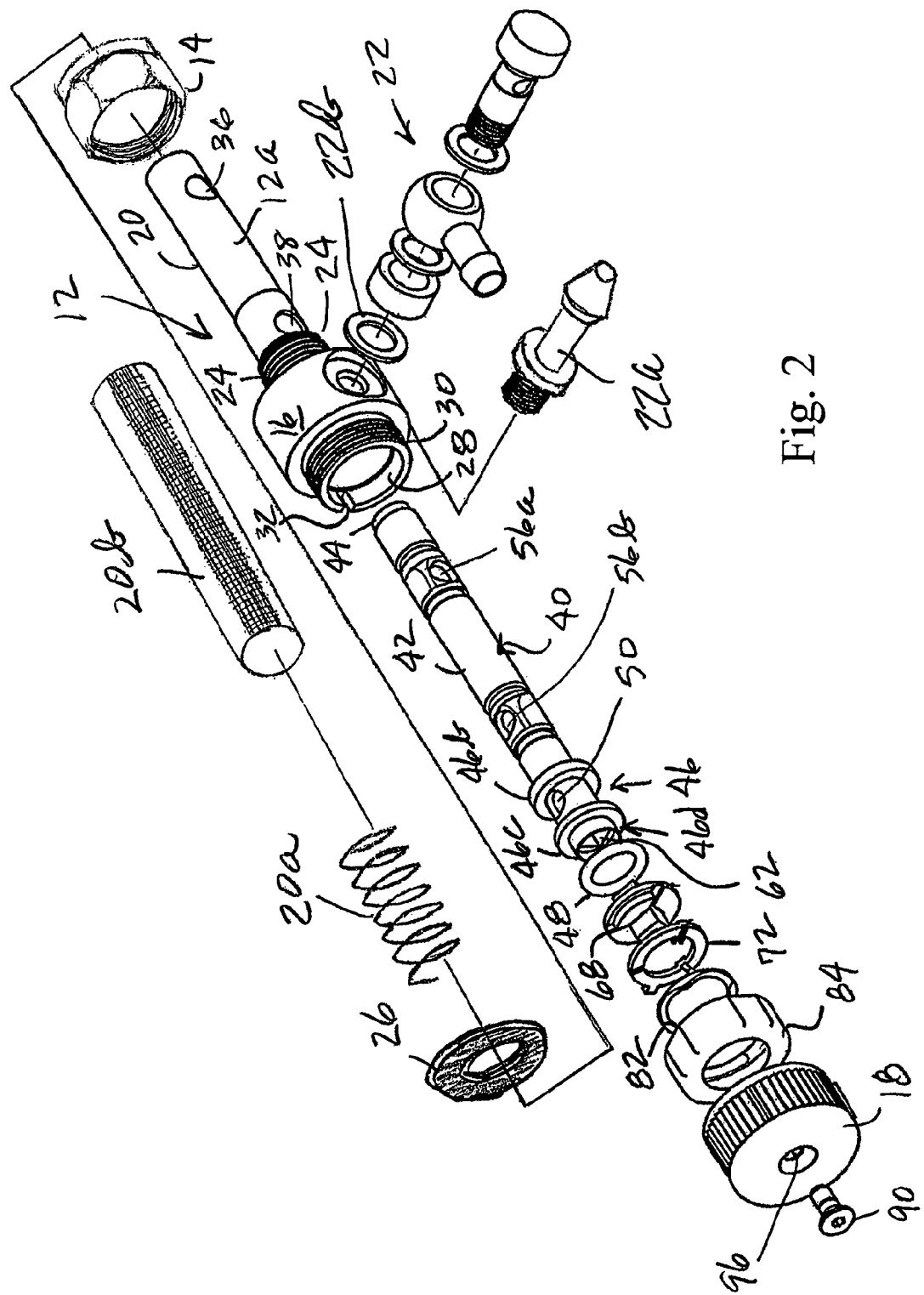
FIG. 2 is an exploded perspective view of a fuel valve as seen in FIG. 1 and embodying the present invention.

Viewing now FIGS. 1, 2, and 3 in conjunction with one another, the elongate body 12 is seen to define a elongate tubular portion 12a, which defines the stand pipe portion 20. As FIG. 2 best shows, the stand pipe portion 20 includes also a helical spacer member 20a, and a cylindrical or tubular screen member 20b. At the base of the elongate tubular portion 12a (i.e., at the base of the stand pipe portion 20), the cylindrical body portion 16 defines a shoulder 12b, and a section 24 of left-handed thread The gland nut 14 is threadably carried upon the left-handed thread section 24, and internally defines a right-handed thread sized to threadably engage a standard size of depending pipe nipple on a motorcycle fuel tank. Accordingly, when the fuel valve is rotationally positioned as desired on this fuel tank nipple and the nut 14 is tightened, this tightening action simultaneously draws the body portion 16 toward the pipe nipple so as to sealingly engage a resilient sealing washer 26 between the shoulder 12b and the end surface of the pipe nipple.

As is best seen in FIG. 3, the body 12 defines a stepped through bore 28, including a larger diameter section 28a, a smaller diameter section 28b, and a shoulder 28c defined between the sections 28a and 28b. The bore 28 also defines a bore opening 28d opening from the lower extent of the body 12. As is seen in FIGS. 2 and 3, the body 12 defines a thread section 30 surrounding the opening 28d, and a notch 32 extending axially and circumferentially outwardly along the extent of the thread section 30. It will be noted that the notch 32 has a selected orientation rotationally relative to other features of the body 12, as will be further described below.

Diametrically opposite in rotational alignment to the notch 32 the body 12 also defines a fuel outlet port 34, which is threaded to receive either a hose barb assembly 22 (i.e., including a conventional banjo bolt type of assembly), or to alternatively directly receive a singular straight hose barb member 22a, as is illustrated in FIG. 2. At the fuel outlet port 34, a counter bore 34a provides for receipt and sealing engagement of a sealing washer 22b of the hose barb or hose barb assembly. In rotational alignment with the outlet port 34, the stand pipe portion 20 defines a pair of axially spaced apart (i.e., vertically spaced apart) ports 36 and 38. These ports 36 and 38 open to the bore portion 28b, and thus communicate with the bore portion 28a and to the outlet port 34.

However, rotationally and sealingly received into the bore 28 is an elongate valving assembly, generally indicated with the numeral 40, and which is best seen in FIGS. 2 and 4. This valving assembly 40 includes an elongate metal tube 42, having an elongate through bore 42a, which is sealingly closed at an upper end by an inserted plastic plug member 44. At its lower end, the tube 42 is sealingly press fitted into a blind bore 46a of a molded plastic drive member 46. As is best seen by a comparison of FIGS. 3 and 4, it is to be appreciated that the drive member 46 defines a pair of axially spaced apart flanges 46b and 46c, the upper one of which engages against shoulder 28c in order to limit the upward movement of the valving assembly into the bore 28 of the body 12. Adjacent to its lower extent, the drive member 46 defines a reduced diameter boss 46d, upon which is received one or more O-ring type of sealing members 48, which sealingly engage the bore portion 28a. A port 50 opens from the bore 42 of the tube 42 between the flanges 46b and 46c, and communicates with the outlet port 34. Above the level of the flanges 46b and 46c, and within the stand pipe portion 20 of the body 12, the tube 42 defines a pair of axially (i.e., vertically) spaced apart sections 52a and 52b, each of which has a slightly reduced diameter. Sealingly and non-rotationally carried on the tube 42 at each of the reduced diameter sections 52a and 52b is one of a pair of sealing collars 54a and 54b (best seen in FIG. 4a), and which are further described below. It will be understood that the sealing collars 54 are non-rotational relative to the valving assembly 40 (and relative to tube 42 of this valving assembly), but are rotational with the valving assembly relatively and within the bore 28 of body 12.

As is best seen viewing FIGS. 2 and 4b, the valving assembly 40 defines a pair of axially (i.e., vertically) spaced apart ports 56a and 56b, each opening through one of the sealing collars 54a/54b, and each opening through the wall of tube 42 to communicate with the bore 42b of this tube. As is seen best in FIG. 2, it is to be noted that the ports 56a and 56b are rotationally out of alignment with one another. Further, as is seen best in FIG. 4b, the sealing collars 54a/54b each include a pair of axially spaced apart and radially projecting ring portions 58, which are respectively disposed one above and one below the respective port 56a and 56b. Similarly, these sealing collars 54a and 54b each also include a pair of circumferentially spaced apart, axially extending rib portions 60 which are similarly disposed one on each side of the respective port 56a and 56b. The rib portions 60 join with the ring portions 58 both top and bottom. Accordingly, as is best seen in FIG. 4B, the ring portions 58 and ribs 60 cooperate to surround each port 56a and 56b. Further, as is seen best in FIGS. 4b and 4c, the ring portions and ribs 58 and 60 each have a coextensive radially outer surface, collectively indicated in the drawing Figures with the numeral 62. This radially outer surface 62 sealingly and movingly engages against the inner surface of the bore 42a of tubular member 42. Further consideration of FIG. 4B in particular will show that the ring s and ribs, 58 and 60, cooperatively form a "window" or "frame" around the respective port 56a or 56b. And, the ring and ribs, 58 and 60 cooperatively form a sealing surface 62 circumscribing or surrounding the particular port. Thus, fuel from the fuel tank is prevented from flowing into the respective port 56a or 56b so long as that port is rotated away from alignment with the respective port 36 or 38 of the stand pipe portion 20.

In order to selectively rotate and position the valving member 40 relative to the body 12 in order to communicate one or the other of ports 56 with the respective port 36 or 38, the drive member 46 includes a bottom hole 64 which is square in axial view. Drivingly received into this square drive hole is an axial protrusion or extension 66 of a drive and detent disk 68 (hereinafter referred to simply as a "detent" disk). The protrusion 66 is also square in axial view, as is best seen in FIG. 5. This detent disk 68 on its face away from the drive member 46 defines three radially and axially extending detent recesses 70 (best seen in FIGS. 2 and 6), each spaced at an angle of about 120° to one another. Disposed in confronting relationship to the detent disk 68 is a detent ring 72, similarly having three radially and axially extending detent ribs 74 (viewing FIGS. 2 and 7). These detent ribs 74 are arranged to each be received into a respective one of the detent recesses 70 in one of three selected rotational positions of the valving member 40 relative to the body 12. In order to set a selected rotational position of the detent ring 72 relative to the body 12, this detent ring includes a radially outwardly extending key member 76, which is received into the notch 32 of the body 12 (viewing FIG. 2). A radially inwardly extending key 78 of the detent ring is diametrically aligned and opposite to the key 76. A limit sector 80 defined on the detent disk 68 engages against the key 78 in two of the possible detented positions of the valving assembly 40 in order to prevent full rotational movement of this valving assembly 40. It should be noted that either or both of the key 78 or the limit sector 80 may optionally be deleted from the fuel valve 10, in which case full rotational movement of the valving assembly 40 is possible, while three detent positions are still provided as will be more fully explained below.

To facilitate detenting engagement of the detent disk 68 and detent ring 72 while still allowing relative rotational movement of the valving assembly 40, an annular wave washer 82 confronts the detent ring. This wave washer 82 yieldably biases the detent ring 72 into detenting engagement with the detent disk 68, and itself is captured by a capture ring 84 threadably engaging the body 12 at thread 30. In order to allow for rotational driving of the valving assembly 40, the detent disk 68 also defines a driven extension 86 (seen best in FIGS. 2 and 6), which is also square in axial view. This driven extension 86 defines a central blind hole or bore 88, which is threaded to receive a screw 90, best seen in FIG. 2. The operating knob 18 includes an internal axially extending boss 92 (best seen in FIG. 8), and this boss 92 includes a recess 94 which is square in axial view, to drivingly receive the driven extension 86. A central countersunk hole 96 of the control knob 18 receives the screw 90, as is illustrated in FIG. 2.

Having considered the structure of the fuel valve 10, attention may now be directed to its operation. As will be appreciated viewing FIG. 2, the ports 36 and 38 are rotationally aligned with one another, while the ports 56a and 56b are not rotationally aligned with one another. The ports 36 and 38 each have a respective one of the ports 56a and 56b axially aligned so that when these axially aligned ports are rotated into alignment with one another fuel from the fuel tank flows through the aligned ports and into the bore 42a of tube 42. As was pointed out above, the bore 42a of the tube 42 communicates via port 50 with the outlet 34 of the fuel valve body 12.

Accordingly, dependent on the rotational position of the valving member 40 relative to the stand pipe portion 20, one or the other (but not both at the same time) of the ports 56a or 56b may communicate with the respective port 36 or 38. As will be appreciated, if the upper one of the ports 36 or 38 is communicated to the outlet 34, then fuel only above the level of this port is available to run the motorcycle. And, fuel below the level of the upper one of ports 36 and 38 is a reserve supply of fuel, and can be accessed by a rider of the motorcycle by selecting an alternative position for the valving member 40 by rotation of the control knob 18. Further, the ports 56a and 56b can be both rotated relative to the ports 36 and 38 so that neither port communicates with the fuel in the fuel tank. In this relative rotational position of the control knob 18, fuel flow is turned "off." Thus, it is to be appreciated that the fuel valve 10 provides three alternative rotational positions for the control knob 18, an "off" position, an "on" position, and a "reserve" position. Further, each of these three alternative positions for the control knob 18 can be manually selected by "feel" by an operator of a motorcycle using the fuel valve 10, because the detent mechanism described above provides a strong and definite tactile "feel" to the operation of the fuel valve 10.

Still further, it will be appreciated from a consideration of the above description of the structure of the fuel valve 10, that the valve 10 may be disassembled and serviced with little difficulty. That is, should the sealing surfaces 58 or 60 of the sealing members 54a and 54b become worn, then these sealing members 54a and 54b may be replaced. Alternatively, the entire valving assembly 40 may be replaced, and the valve 10 will then be restored to "like new" function. Thus, the fuel valve according to this present invention may provide a long service life, and the service life of the fuel valve is not limited by any inability for the valve to be disassembled and services, as for replacement of seals or O-rings, for example.

Further, it is apparent from the above that the fuel valve 10 may be installed in a variety of orientations because it is selectively rotational relative to the pipe nipple to which it is attached, and the fuel outlet may be provided with a banjo bolt hose barb assembly 22 allowing the connected fuel line to extend from the fuel valve in any convenient and desired direction. Alternatively, a straight hose barb 22a may be employed on the fuel valve if desired.

Those skilled in the art will further appreciate that the present invention may be embodied in other specific forms without departing from the spirit or central attributes thereof. Because the foregoing description of the present invention discloses only particularly preferred exemplary embodiments of the invention, it is to be understood that other variations are recognized as being within the scope of the present invention. Accordingly, the present invention is not limited to the particular embodiment which has been described in detail herein. Rather, reference should be made to the appended claims to define the scope and content of the present invention.

I claim:

1. A fuel valve for attachment to a lower extent of a fuel tank, said fuel valve comprising:
    a vertically elongate valve body including a external body portion disposed external to said fuel tank and carrying an operating handle for said fuel valve; said external portion also having a fuel outlet port;
    an elongate stand pipe portion extending from said external body portion and extending generally vertically upwardly within said fuel tank and fuel therein, said stand pipe portion defining a pair of vertically spaced apart ports each allowing flow of fuel into said stand pipe portion;
    said valve body and stand pipe portion cooperatively forming an elongate stepped through bore extending in said valve body and stand pipe portion, and including a larger diameter portion within said valve body and a smaller diameter portion within said stand pipe portion;
    an elongate stepped valving assembly rotationally received into said stepped through bore of said external body portion and stand pipe portion, and said stepped valving assembly including a larger diameter portion rotational within said external body portion and a smaller diameter portion rotational within and extending upwardly within said stand pipe portion, said elongate valving assembly including a tubular part disposed within said stand pipe portion defining a radial clearance therewith and defining a flow path communicating to said fuel outlet port, and said tubular part defining a respective pair of vertically spaced apart openings aligning axially with said pair of ports of said stand pipe portion and rotational relative thereto to each be rotated between a first position in which an opening of said tubular part is rotationally aligned with a respective port of said stand pipe portion and allows flow of fuel into said tubular part, and a second position in which said opening of said tubular part is rotated out of rotational alignment with a respective port of said stand pipe portion and prevents flow of fuel into said tubular part;
    and drive mechanism drivingly connecting said operating handle to said valving assembly so that movement of said operating handle moves said valving assembly rotationally within said stand pipe portion;
    further including a resilient axially open tubular seal member disposed radially between and extending across said radial clearance between said tubular part and said stand pipe portion to sealingly engage with both said tubular part and with said stand pipe portion, said annular seal member being rotationally fixed relative to said tubular part and being rotational therewith and defining a single aperture, said single aperture aligning with the opening of said tubular part to which said tubular seal member is rotationally fixed to rotate in therewith, said annular seal member being axially and circumferentially continuous and defining said single aperture aligning with a respective one of said pair of openings of said valve assembly and further including a pair of axially spaced apart circumferential ring portions, and a pair of circumferentially spaced apart axially extending rib portions joining with said ring portions, and said ring portions and rib portions cooperatively defining a radially disposed continuous sealing surface which, circumscribes said aperture and sealingly engages against said stand pipe portion so as to prevent the flow of fuel into said stand pipe portion when said fuel valve is in its second position.

2. The fuel valve of claim 1 wherein said drive mechanism includes said elongate valving assembly including a drive member drivingly engaging sealingly with one end of said tubular part, said drive member including a drive socket, and a drive and detent disk member disposed adjacent to said drive member and including a protrusion extending into and drivingly engaging said drive socket, said drive and detent disk member including a detent feature associated with said valve body to establish at least two preferred rotational positions for said elongate valve assembly relative to said valve body, and said operating handle being drivingly connected with said drive and detent disk member.

3. The fuel valve of claim 2 wherein said detent feature includes said drive and detent disk member including at least a pair of circumferentially spaced apart detent grooves, and a detent member associated with said valve body and including a detent rib engageable into said detent grooves to establish said preferred rotational positions for said elongate valving assembly.

4. A method of providing fuel valving at a lower extent of a fuel tank, said fuel valving method including steps of:
    providing a vertically elongate valve body including a external body portion, disposing said valve body external to said fuel tank, carrying an operating handle on said external body portion, and disposing a fuel outlet port on said external body portion;
    extending a generally vertically upwardly extending elongate stand pipe portion of said valve body within said fuel tank and fuel therein, defining on said stand pipe portion a pair of vertically spaced apart ports each allowing flow of fuel into said stand pipe portion;
    defining within said valve body and stand pipe portion an elongate stepped through bore, said through bore including a larger diameter portion within said valve body and a smaller diameter portion within said stand pipe portion;
    receiving an elongate valving assembly rotationally into said stepped through bore of said external body portion and stand pipe portion, with said valving assembly including a larger diameter portion rotational within said larger diameter bore portion, and a smaller diameter portion rotational within and extending upwardly within said stand pipe portion, including in said smaller diameter portion of said elongate valving assembly a tubular part disposed within said stand pipe portion and cooperatively defining therewith a radial clearance, and utilizing said tubular part to define a flow path communicating to said fuel outlet port, providing on said tubular part a respective pair of vertically spaced apart openings aligning axially with said pair of ports of said stand pipe portion and rotational relative thereto in response to rotation of said valving assembly so that each of said pair of openings can be rotated between a first position in which an opening of said tubular part is rotationally aligned with a respective port of said stand pipe portion and allows flow of fuel into said tubular part, and a second position in which said opening of said tubular part is rotated out of rotational alignment with a respective port of said stand pipe portion and prevents flow of fuel into said tubular part; and
    providing a drive mechanism drivingly connecting said operating handle to said valving assembly so that movement of said operating handle moves said valving assembly rotationally within said stand pipe portion;

further including the steps of providing a resilient axially open tubular seal member disposed radially between said tubular part and said stand pipe portion and extending across said radial clearance therebetween, configuring said tubular seal member to be axially and circumferentially continuous, fixing said annular seal member rotationally relative to said tubular part to be rotational therewith and defining on said annular seal member a single aperture aligning with the opening of said tubular part further providing on said annular seal member a pair of axially spaced apart circumferential ring portions and a pair of circumferentially spaced apart axially extending rib portions joining with said ring portions, utilizing said ring portions and rib portions cooperatively to define a radially disposed continuous sealing surface having a greater radial height than the remainder of said tubular seal member, and which sealing surface circumscribes said aperture, and sealingly engaging said continuous sealing surface against said stand pipe portion so as to prevent the flow of fuel into said stand pipe portion when said fuel valve is in its second position.

5. The fuel valving method of claim 4 further including the steps of said drive mechanism including said elongate valving assembly including a drive member drivingly engaging sealingly with one end of said tubular part, including in said drive member a drive socket, and providing a drive and detent disk member disposed adjacent to said drive member and including a protrusion extending into and drivingly engaging said drive socket, providing for said drive and detent disk to include a detent feature associated with said valve body to establish at least two preferred rotational positions for said elongate valve assembly relative to said valve body, and drivingly connecting said operating handle with said drive and detent disk member.

6. The fuel valving method of claim 5 further including the steps of said drive and detent disk member including at least a pair of circumferentially spaced apart detent grooves, and associating a detent rib of said detent feature into said detent grooves to establish said preferred rotational positions for said elongate valving assembly.

7. A fuel valve especially for attachment to a lower extent of a motorcycle fuel tank, said fuel valve comprising:

a vertically elongate valve body including a external body portion disposed external to said fuel tank, said external body portion carrying both an operating handle for said fuel valve, and a gland nut threadably engageable with a depending fuel nipple of said fuel tank; said external portion also having a fuel outlet port for sealingly receiving a fuel line connection;

an elongate stand pipe portion extending from said external body portion generally vertically upwardly within said fuel tank and exposed to fuel therein, said valve body including said external body portion and said stand pipe portion defining a generally vertically extending stepped through bore, said stepped through bore including a larger diameter portion disposed within said external body portion, and a smaller diameter bore portion disposed within said stand pipe portion, and said larger and smaller diameter bore portions cooperatively defining a shoulder on said stepped through bore, said stand pipe portion defining a pair of vertically spaced apart ports each allowing flow of fuel into said stand pipe portion;

an elongate valving assembly rotationally received into said stepped through bore to be disposed within said external body portion and extending upwardly within said stand pipe portion, said elongate valving assembly including a tubular part extending within said stand pipe portion to define a radial clearance therewith and defining a flow path communicating to said fuel outlet port, and said tubular part defining a respective pair of vertically spaced apart openings aligning axially with said pair of ports of said stand pipe portion and rotational relative thereto to each be rotated between a first position in which an opening of said tubular part is rotationally aligned with a respective port of said stand pipe portion and allows flow of fuel into said tubular part and from said fuel outlet port, and a second position in which said opening of said tubular part is rotated out of rotational alignment with a respective port of said stand pipe portion and prevents flow of fuel into said tubular part;

said elongate valving assembly including a pair of elongate annular sleeve-like seal members each disposed radially outwardly of said valving assembly and inwardly of said stand pipe portion and extending radially across said radial clearance therebetween, each one of said pair of elongate annular seal members being fixed in rotation with said valving assembly each at a respective one of said pair of vertically spaced apart openings so as to be rotational therewith relative to said stand pipe portion, and each of said pair, of elongate annular seal members being axially and circumferentially continuous and defining a respective single aperture aligning with a port and opening of the valving assembly and stand pipe portion, and each one of said pair of elongate seal members further providing about each of said pair of apertures a pair of axially spaced apart circumferential ring portions and a pair of circumferentially spaced apart axially extending rib portions joining with said ring portions, so that said ring portions and said rib portions cooperatively define a respective pair of radially outwardly disposed continuous sealing surfaces which respectively circumscribe a respective one of said apertures of said tubular part, and said radially outwardly disposed continuous sealing surfaces sealingly and movably engaging against said stand pipe portion so as to prevent the flow of fuel into said valving assembly when said fuel valve is in its second position;

and a drive mechanism drivingly connecting said operating handle to said valving assembly so that rotational movement of said operating handle rotates said valving assembly within said stand pipe portion among three operative positions, a first of said three operative positions communicating fuel from an upper one of said pair of ports of said stand pipe portion to said fuel outlet port, a second of said three operating positions communicating fuel from a lower one of said pair of ports of said stand pipe portion to said fuel outlet port, and a third of said operating positions preventing fuel flow from said outlet port by rotating both openings of said valving assembly out of rotational alignment with the pair of ports of said stand pipe portion.

* * * * *